(12) United States Patent
Zhao (10) Patent No.: US 9,159,972 B2
(45) Date of Patent: Oct. 13, 2015

(54) BATTERY MODULE

(75) Inventor: Weiping Zhao, Superior Township, MI (US)

(73) Assignee: TYCO ELECTRONICS CORPORATION, Berwyn, PA (US)

(*) Notice: Subject to any disclaimer, the term of this patent is extended or adjusted under 35 U.S.C. 154(b) by 519 days.

(21) Appl. No.: 13/427,474

(22) Filed: Mar. 22, 2012

(65) Prior Publication Data

US 2013/0252046 A1  Sep. 26, 2013

(51) Int. Cl.
*H01M 2/10* (2006.01)
*H01M 2/20* (2006.01)
*H01M 2/30* (2006.01)

(52) U.S. Cl.
CPC ............ *H01M 2/1077* (2013.01); *H01M 2/206* (2013.01); *H01M 2/305* (2013.01); *H01M 2220/20* (2013.01)

(58) Field of Classification Search
None
See application file for complete search history.

(56) References Cited

U.S. PATENT DOCUMENTS

2006/0270277 A1\* 11/2006 Zhao et al. ..................... 439/627
2011/0117420 A1\* 5/2011 Kim et al. ...................... 429/158
2012/0305048 A1\* 12/2012 Tsuruoka et al. ............. 136/244

\* cited by examiner

*Primary Examiner* — Sarah A Slifka (57) ABSTRACT

A battery module includes first and second battery cells having positive and negative cell terminals arranged adjacent one another. A buss bar connects the positive cell terminal of the first battery cell to the negative cell terminal of the second battery cell. The connection to the positive cell terminal is a threaded connection. The connection to the negative cell terminal is a quick connect connection.

20 Claims, 6 Drawing Sheets

BATTERY MODULE

BACKGROUND OF THE INVENTION

The subject matter herein relates generally to battery modules.

Battery modules, such as those for electric vehicles or hybrid vehicles, typically includes a plurality of cells grouped together to form the battery modules. The battery modules are connected together to form battery packs. Each of the cells includes positive and negative cell terminals that are electrically connected together. Different types of battery modules are formed using different types of cells. For example, one type of battery modules are known as pouch type battery modules, another type of battery modules are known as prismatic battery modules, and a third type of battery modules are known as cylindrical battery modules.

Prismatic battery modules use prismatic battery cells that are stacked together. The positive terminals are aluminum and the negative terminals are copper. The positive and negative cell terminals have either threaded bores or threaded studs that receive threaded screws or threaded nuts, respectively, for terminating buss bars thereto. The buss bars are plates with two openings that are placed over adjacent positive and negative terminals. When using the threaded studs, the threaded studs pass through the openings and the threaded nuts are tightened to the threaded studs. The studs are typically steel studs that are screwed into the positive and negative terminals. When using the threaded screws, the openings in the buss bars are aligned with the threaded bores of the positive and negative terminals and then the threaded screws are loaded through the openings and tightened in the threaded bores. Both mounting techniques require a threaded connection to both the positive terminal and to the negative terminal. Tightening of the threaded nut or the threaded screw is time consuming, particularly since a typical battery module includes ten or more cells, thus having twenty or more nuts or screws to tighten. Tightening of the threaded nut or the threaded screw may cause over torque, under torque and/or cross threading. The over torque may damage the internal components of the cell and affect cell performance.

A need remains for battery modules that may be assembled quickly and reliably. A need remains for battery modules having terminals and buss bars that may be connected in an efficient manner.

BRIEF DESCRIPTION OF THE INVENTION

In one embodiment, a battery module is provided having first and second battery cells having positive and negative cell terminals arranged adjacent one another. A buss bar connects the positive cell terminal of the first battery cell to the negative cell terminal of the second battery cell. The connection to the positive cell terminal is a threaded connection. The connection to the negative cell terminal is a quick connect connection.

Optionally, the quick connect connection may be made by plugging the buss bar onto the negative cell terminal. The quick connect connection may be made by an action in a linear direction while the threaded connection may be made by an action in a rotation direction. The threaded connection may be made by at least one of a threaded nut and a threaded screw.

Optionally, the buss bar may include a quick connection end and a threaded connection end. The threaded connection end may include an opening receiving a threaded fastener therethrough. The quick connection end may have a post with a chamber and an inner surface defining the chamber, and with an outer surface. A contact spring may be coupled to the post and engage either the inner surface or the outer surface. The contact spring engages the negative cell terminal to electrically couple the negative cell terminal to the buss bar.

Optionally, the buss bar may include a plate extending between a quick connection end and a threaded connection end. The plate may include an opening at the threaded connection end receiving a threaded fastener therethrough. The plate may include a post extending therefrom at the quick connection end. A contact spring may be spring biased between the post and the negative cell terminal to create an electrical path between the negative cell terminal and the buss bar. An optional voltage sensing pin may extend from the buss bar that is electrically connected to a module controller for monitoring a voltage on the buss bar.

Optionally, the negative cell terminal may include a smooth bore that receives a contact spring therein. The buss bar may have a post received in the bore of the negative cell terminal with the contact spring engaging the post to electrically couple the negative cell terminal to the buss bar. Optionally, the negative cell terminal may include a pin extending therefrom and the buss bar may have a post with a chamber and a contact spring received inside the chamber. The buss bar may be coupled to the negative cell terminal such that the pin is received in the chamber with the contact spring engaging the pin to electrically couple the negative cell terminal to the buss bar.

Optionally, the positive cell terminal may include a threaded bore that threadably receives a threaded screw. The buss bar may have an opening aligned with the threaded bore that receives the threaded screw therethrough. The buss bar may be captured between a head of the threaded screw and the positive cell terminal. The positive cell terminal may include an upper shoulder and a threaded stud extending upward from the upper shoulder. The buss bar may have an opening aligned with and receiving the threaded stud. A threaded nut may be threadably coupled to the threaded stud with the buss bar being captured between the threaded nut and the upper shoulder. Optionally, the threaded stud may be integrally with the positive cell terminal.

In another embodiment, a battery module is provided including a first battery cell having a positive cell terminal and a negative cell terminal. A first buss bar is configured to be connected to a second battery cell. The first buss bar includes a quick connection end and a threaded connection end. The quick connection end is configured to be connected to the second battery cell. The threaded connection end is connected to the positive cell terminal by a threaded connection. The threaded connection end has an opening receiving a threaded fastener therethrough. The threaded fastener secures the threaded connection end to the first battery cell. The battery module includes a second buss bar configured to be connected to a third battery cell. The second buss bar includes a quick connection end and a threaded connection end. The quick connection end is connected to the negative cell terminal of the first battery cell by a quick connect connection. The threaded connection end has an opening configured to receive a threaded fastener therethrough.

DETAILED DESCRIPTION OF THE INVENTION

Figure 1:
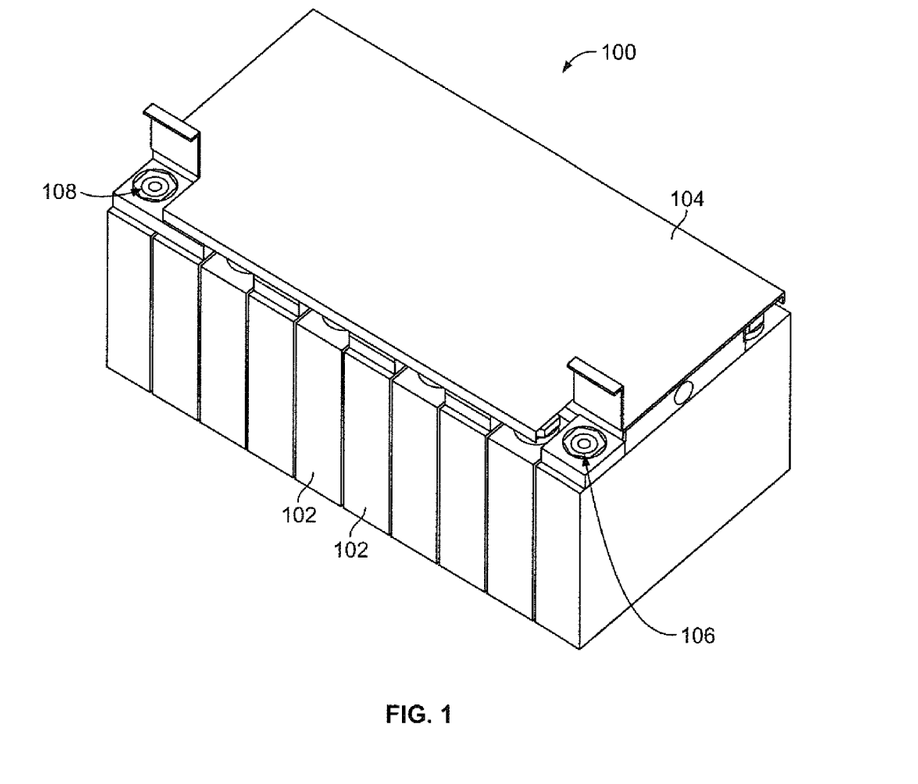
FIG. 1 is a top perspective view of a battery module formed in accordance with an exemplary embodiment.

FIG. 1 is a top perspective view of a battery module 100 formed in accordance with an exemplary embodiment. The battery module 100 may be used as part of a battery system in a vehicle, such as an electric vehicle or a hybrid electrical vehicle. The battery module 100 may be used in other applications in alternative embodiments.

The battery module 100 includes a plurality of battery cells 102. In the exemplary embodiment, the battery calls are prismatic battery cells 102 arranged in a stacked configuration, side-by-side, to form the battery module 100. The battery cells 102 may be define a first battery cell, a second battery cell, a third battery cell, etc. Any number of battery cells 102 may be provided. Optionally, the battery module 100 may include a case or other housing that holds the prismatic cells 102. A battery cover 104 is provided over the tops of the prismatic battery cells 102. The battery cover 104 may cover each of the prismatic battery cells 102.

The battery module 100 includes a positive battery terminal 106 and a negative battery terminal 108. The battery terminals 106, 108 are configured to be coupled to an external power cable or alternatively may be bussed to battery terminals of another battery module 100. In an exemplary embodiment, the battery terminals 106, 108 are of different types. The battery terminals 106, 108 are configured to be connected using different types of connections. For example, the positive battery terminal 106 may be coupled using a threaded connection while the negative battery terminal 108 may be coupled using a quick connect type of connection.

Figure 2:
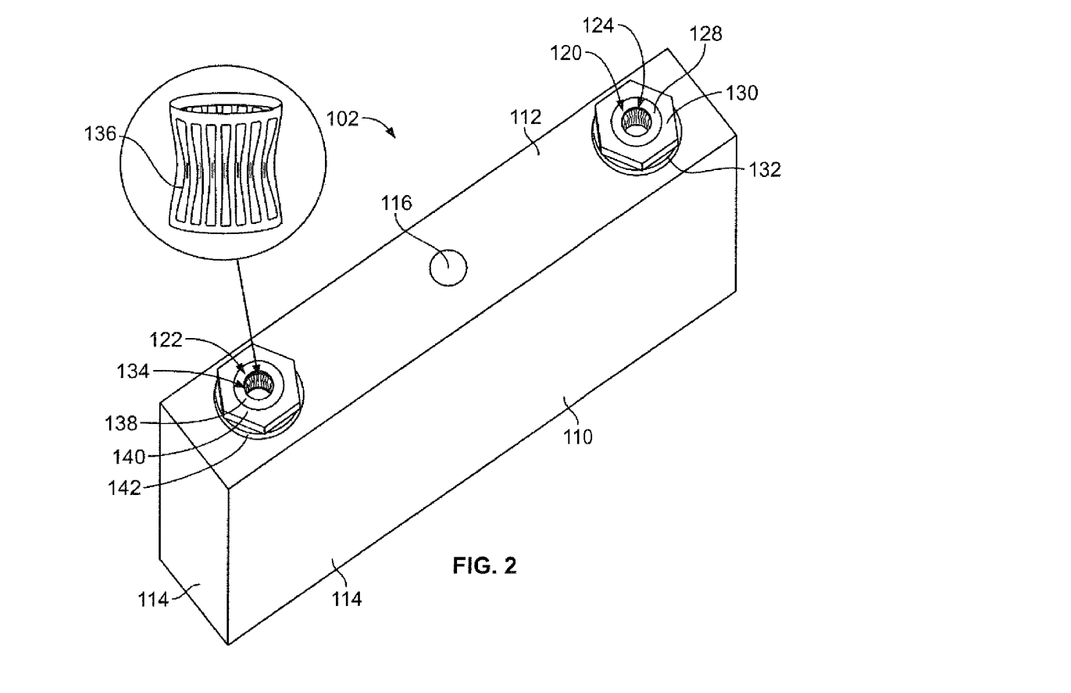
FIG. 2 is a top perspective view of a prismatic battery cells formed in accordance with exemplary embodiment for use with the battery module shown in FIG. 1.

FIG. 2 is a top perspective view of one of the battery cells 102 formed in accordance with exemplary embodiment. The battery cell 102 includes a cell housing 110 having a top 112 and side walls 114. In the illustrated embodiment, the cell housing 110 is boxed shaped having four side walls 114. The battery cell 102 has a gas pressure valve 116 on the top 112.

The battery cell 102 includes a positive cell terminal 120 and a negative cell terminal 122. The positive cell terminal 120 defines a threaded cavity that is configured for a threaded connection. The negative cell terminal 122 defines a smooth bore that is configured for a quick connect connection.

Figure 4:
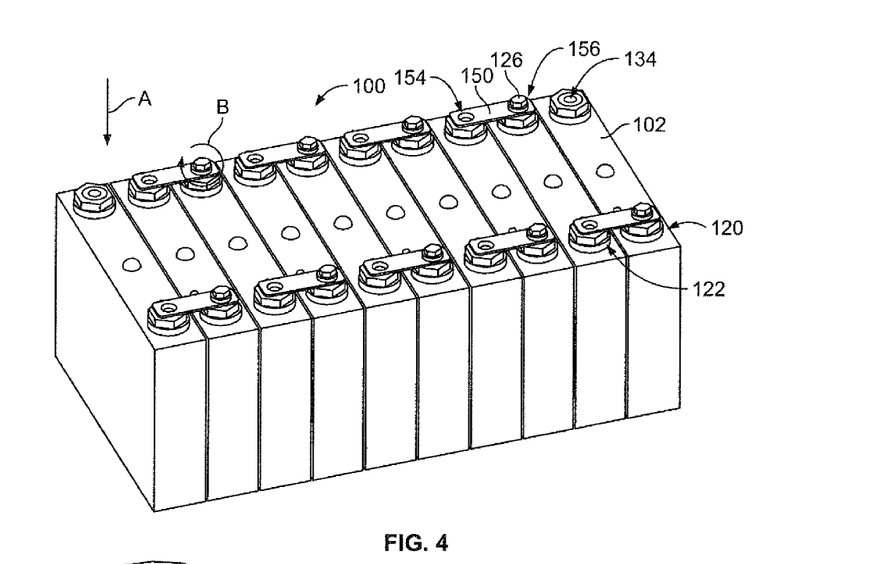
FIG. 4 is a top perspective view of the battery module illustrating the buss bars shown in FIG. 3 connected between the battery cells shown in FIG. 2.

The positive cell terminal 120 includes a threaded bore 124 that is configured to threadably receive a threaded screw 126 (shown in FIG. 4). The positive cell terminal 120 has an upper shoulder 128 exposed at a top of the positive cell terminal 120. A hex nut 130 is coupled to the positive cell terminal 120 to hold the positive cell terminal 120 with respect to the top 112 of the cell housing 110. A spacer 132 is positioned between the hex nut 130 and the top 112 of the cell housing 110. Other connection means or components may be used in alternative embodiments to secure the positive cell terminal 120 to the cell housing 110.

The negative cell terminal 122 includes a smooth bore 134 therein. The bore 134 receives a contact spring 136 (shown poised for loading into the bore 134). The negative cell terminal 122 has an upper shoulder 138 exposed at a top of the negative cell terminal 122. A hex nut 140 is coupled to the negative cell terminal 122 to hold the negative cell terminal 122 with respect to the top 112 of the cell housing 110. A spacer 142 is positioned between the hex nut 140 and the top 112 of the cell housing 110. Other connection means or components may be used in alternative embodiments to secure the negative cell terminal 122 to the cell housing 110.

Figure 3:
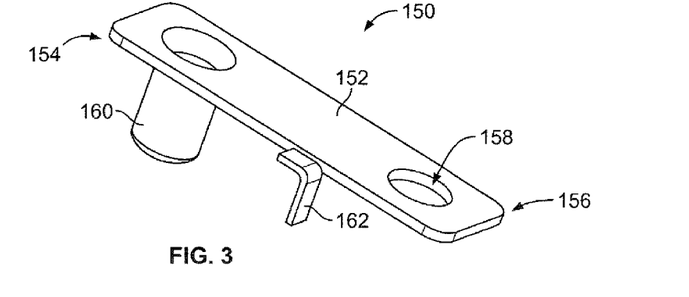
FIG. 3 is a top perspective view of a buss bar formed in accordance with an exemplary embodiment.

FIG. 3 is a top perspective view of a buss bar 150 formed in accordance with an exemplary embodiment. The buss bar 150 is used to electrically connect battery terminals of adjacent prismatic battery cells 102 (shown in FIG. 2). The buss bar 150 includes a plate 152 extending between a quick connection end 154 and a threaded connection end 156. The plate 152 includes an opening 158 at the threaded connection end 156. The opening 158 is configured to receive a threaded fastener, such as the threaded screw 126 (shown in FIG. 4), therethrough. Optionally, the opening 158 maybe elongated along a longitudinal axis of the plate 152 to adjust alignment between the cell terminals 120, 122 (shown in FIG. 2). In the illustrated embodiment, the plate 152 is generally rectangular in shape and is elongated along the longitudinal axis of the plate 152. The plate 152 may have other shapes and alternative embodiments.

The plate 152 includes a post 160 extending therefrom at the quick connection end 154. Optionally, the post 160 may be cylindrical in shape. In the illustrated embodiment, the post 160 extends downward from the plate 152. The post 160 extends out of a plane defined by the plate 152. Optionally, the post 160 may be hollow. In an exemplary embodiment, the post 160 is extruded from the plate 152. The post 160 may be formed by other processes and alternative embodiments. Optionally, the post 160 may be integrally formed with the plate 152. Alternatively, the post 160 may be a separate component from the plate 152 and coupled thereto, such as by soldering, welding, fastening or otherwise securing the post 160 to the plate 152. The post 160 may be hollow or may be solid.

In an exemplary embodiment, the buss bar 150 includes a voltage sensing pin 162 extending therefrom. The location of the voltage sensing pin 162 may vary depending on the particular application. Some embodiments may not include a voltage sensing pin 162. In the illustrated embodiment, the voltage sensing pin 162 is approximately centered between the opening 158 and the post 160. The voltage sensing pin 162 is bent out of the plane defined by the plate 152. In an exemplary embodiment, the voltage sensing pin 162 is integrally formed with the plate 152. In alternative embodiments, the voltage sensing pin 162 may be a separate component coupled to the plate 152, such as by being soldered, welded, fastened or otherwise secured to the plate 152. Optionally, the voltage sensing pin 162 may be stamped and formed with the plate 152. The voltage sensing pin 162 may be electrically connected to a module controller that monitors the voltage of the cells by measuring the voltage on the buss bar 150.

FIG. 4 is a top perspective view of the battery module 100 with the battery cover 104 (shown in FIG. 1) removed to illustrate the battery cells 102 and the buss bars 150 connected between the battery cells 102. The battery cells 102 are arranged side-by-side adjacent one another. The cell terminals 120, 122 are generally aligned with corresponding cell terminals 120, 122 of adjacent battery cells 102 near outer edges of the battery cells 102. In an exemplary embodiment, the battery cells 102 are arranged such that the positive cell terminal 120 of each battery cell 102 is located between negative cell terminals 122 of the two adjacent battery cells 102. Similarly, each negative cell terminal 122 is located between positive cell terminals 120 of the two adjacent battery cells 102. The cell terminals 120, 122 thus have an alternating positive-negative-positive-negative configuration.

The buss bars 150 are used to connect adjacent battery cells 102. Each buss bar 150 is connected to a positive cell terminal 120 of one battery cell 102 and a negative cell terminal 122 of an adjacent battery cell 102. The buss bars 150 may be define a first buss bar, a second buss bar, a third buss bar, etc. Any number of buss bars 150 may be provided. The quick connection end 154 of each buss bar 150 is coupled to one of the negative cell terminals 122 while the threaded connection end 156 of each buss bar 150 is coupled to the corresponding positive cell terminal 120 using a corresponding threaded screw 126. The quick connect connection between the buss bar 150 and the negative cell terminal 122 is made by plugging the post 160 (shown in FIG. 3) of the buss bar 150 onto the negative cell terminal 122. The bore 134 of the negative cell terminal 122 receives the post 160. The quick connect connection is made by an action in an linear direction, such as shown by arrow A, while the threaded connection is made by an action of rotating the threaded screw 126 in a rotation direction, such as shown by arrow B. No other action is required to make the electrical connection between the buss bar 150 and the negative cell terminal 122 other than plugging the post 160 into the bore 134 of the negative cell terminal 122. Having the buss bar 150 connected to the two battery cells 102 by only making one threaded connection reduces the assembly time of the battery module 100. For example, half the number of threaded connections need to be made when utilizing buss bars 150 with quick connect connections. Eliminating threaded connections to some of the cell terminals (e.g. the negative cell terminals 122) eliminates potential failure modes due to over tightening, under tightening cross-threading and the like. In alternative embodiments, the quick connect end may be coupled to the positive cell terminal 120 while the threaded connection end is coupled to the negative cell terminal 122.

Figure 5:
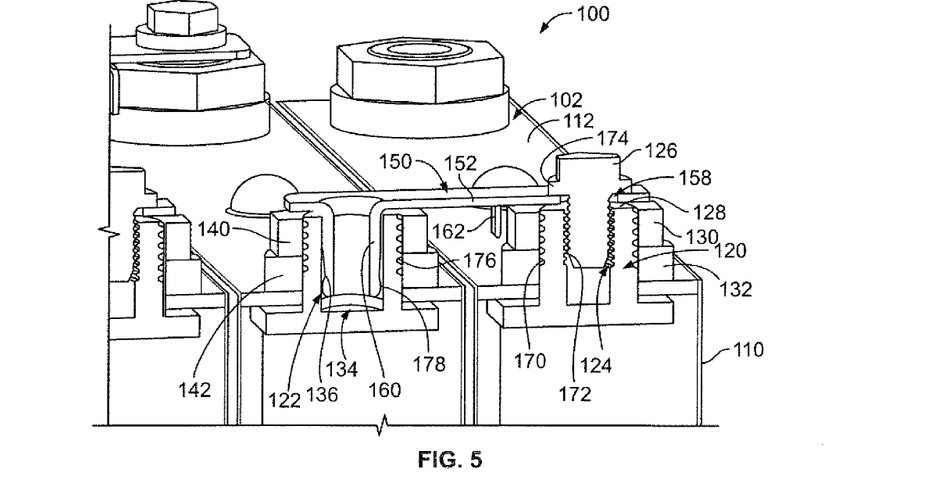
FIG. 5 is a partial cross sectional view of a portion of the battery module.

FIG. 5 is a partial cross sectional view of a portion of the battery module 100. The positive cell terminal 120 is shown connected to the cell housing 110 using the hex nut 130 with the spacer 132 between the hex nut 130 and the top 112 of the cell housing 110. The positive cell terminal 120 includes external threads 170 that are coupled to the hex nut 130 to secure the positive cell terminal 120 to the cell housing 110. Other fixing structures may be used in alternative embodiments to secure the positive cell terminal 120 to the cell housing 110.

The threaded bore 124 of the positive cell terminal 120 is also illustrated in FIG. 5. The threaded screw 126 is coupled to internal threads 172 of the threaded bore 124. In an exemplary embodiment, the positive cell terminal 120 is manufactured from aluminum. The threaded screw 126 is manufactured from steel. Other materials may be used for the components in other embodiments. A mechanical and electrical connection is made between the terminal screw 126 and the cell terminal 120.

The opening 158 of the buss bar is aligned with the threaded bore 124 such that the threaded screw 126 may be passed through the opening 158 into the threaded bore 124. As the threaded screw 126 is tighten, the plate 152 is captured between a head 174 of the threaded screw 126 and the upper shoulder 128. An electrical connection is made between the buss bar 150 and the positive cell terminal 120 by the intimate contact between the buss bar 150 and the upper shoulder 128 and/or by an electrical path defined between the positive cell terminal 120 and the threaded screw 126.

The negative cell terminal 122 is illustrated in FIG. 5 connected to the cell housing 110 by the hex nut 140. The negative cell terminal 122 includes external threads 176 that are engaged by the hex nut 140 to couple the negative cell terminal 122 to the cell housing 110. The spacer 142 is captured between the hex nut 140 and the top 112 of the cell housing 110. Other fixing structures may be used in alternative embodiments to secure the negative cell terminal 122 to the cell housing 110.

The smooth bore 134 of the negative cell terminal 122 is illustrated in FIG. 5. The contact spring 136 is received in the bore 134 and engages the wall of the negative cell terminal 122 defining the bore 134. The contact spring 136 is electrically connected to the negative cell terminal 122 by the direct engagement between the contact spring 136 and the negative cell terminal 122 and the bore 134. In an exemplary embodiment, the negative cell terminal 122 is manufactured from copper or a copper alloy. The contact spring 136 is manufactured from copper or a copper alloy. The buss bar 150 is plugged into the contact spring 136 and negative cell terminal 122 is manufactured from copper or a copper alloy. Other materials may be used for the components in other embodiments.

The post 160 is sized and shaped to fit into the bore 134. When the post 160 is loaded into the bore 134, an outer surface 178 of the post 160 engages the contact spring 136. The contact spring 136 is spring biased against the outer surface 178 of the post 160 to ensure engagement between the post 160 and the contact spring 136. An electrical path is created between the post 160 and the negative cell terminal 122 by the contact spring 136. No other mechanical manipulation of the buss bar 150 or the post 160 is needed to create the electrical connection between the buss bar 150 and the negative cell terminal 122 other than plugging the post 160 directly into the bore 134. A quick connection is defined between the negative cell terminal 122 and the buss bar 150.

When the buss bars 150 are coupled to the cell terminals 120, 122, the voltage sensing pins 162 face inward into the interior space between the rows of cell terminals 120, 122. The voltage sensing pins 162 are configured to be electrically connected to a module controller (not shown) positioned along the middle of the battery cells 102. The voltage sensing pins 162 are configured to be directly connected to such module controller rather than being connected to a remote module controller by individual wires configured as a wire harness extending from the battery module 100 to such remote location.

Figure 6:
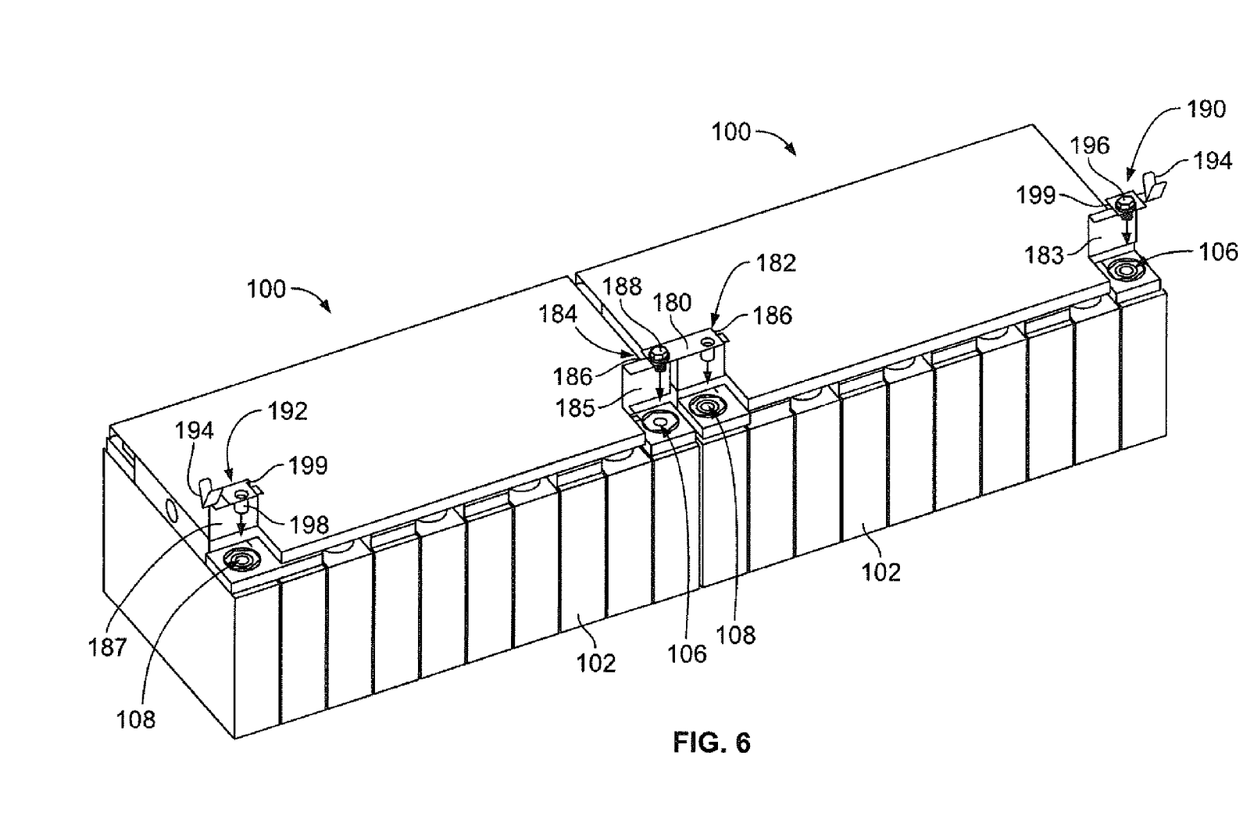
FIG. 6 illustrates two battery modules arranged adjacent one another in line with one another.

FIG. 6 illustrates two battery modules 100 arranged adjacent one another in line with one another. A module to module buss bar 180 is used to electrically connect one battery module 100 with the other battery module 100. The module-to-module buss bar 180 may be similar to the buss bars 150 (shown in FIG. 3). The module-to-module buss bar 180 includes a quick connection end 182 and a threaded connection end 184. The quick connection end 182 is configured to be coupled to the negative battery terminal 108 of one of the battery modules 100 while the threaded connection end 184 is configured to be coupled to the positive battery terminal 106 of the other battery module 100. The positive and negative battery terminals 106, 108 are defined by the outermost positive and negative cell terminals 120, 122 (shown in FIG. 4) of the outermost battery cells 102 of the battery module 100.

In an exemplary embodiment, voltage sensing pins 186 extend from each of the ends 182, 184 of the module to module buss bar 180. The voltage sensing pins 186 extending from the longitudinal ends of the buss bar 180 as opposed to a centrally located side of the buss bar, as is the case with the buss bars 150. Other positions are possible in alternative embodiments. A threaded screw 188 is used to secure the buss bar 180 to the corresponding battery module 100. The threaded screw 188 may be identical to the threaded screws 126 (shown in FIG. 4) used to secure the buss bars 150 between the battery cells 102.

A positive battery terminal contact 190 is configured to be coupled to a positive battery terminal 106 of one of the battery modules 100 while a negative battery terminal contact 192 is configured to be coupled to the negative battery terminal 108 of the corresponding battery module 108. The terminal contacts 190, 192 have crimp ends 194 that are configured to be crimped to ends of wires or cables that supply power to the battery modules 100. The positive battery terminal contact 190 defines a threaded connection while the negative battery terminal contact 192 defines a quick connect connection. For example, the positive battery terminal contact 190 is coupled to the positive battery terminal 106 using a threaded screw 196, while the negative battery terminal contact 192 includes a post 198 similar to the post 160 (shown in FIG. 3) of the buss bars 150. The terminal contacts 190, 192 includes voltage sensing pins 199 extending therefrom.

In an exemplary embodiment, plastic covers 183, 185, 187 are closed after the buss bar 180 and battery terminal contacts 190, 192 are fully engaged with the corresponding battery cell terminals 106, 108.

Figure 7:
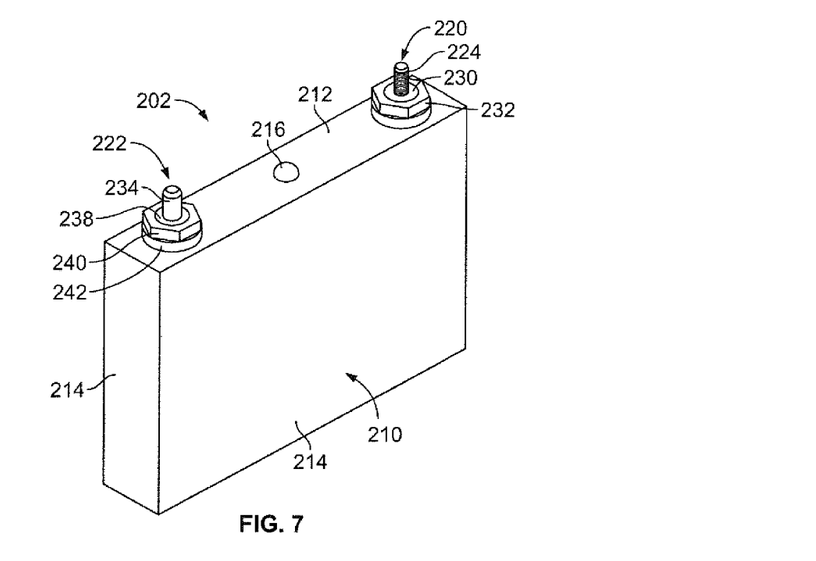
FIG. 7 is a top perspective view of a prismatic battery cell formed in accordance with an exemplary embodiment.

FIG. 7 is a top perspective view of a prismatic battery cell 202 for use with another battery module and formed in accordance with an exemplary embodiment. The battery cell 202 may be used as part of a battery system in a vehicle, such as an electric vehicle or a hybrid electrical vehicle. The battery cell 202 may be used in other applications in alternative embodiments.

The prismatic battery cell 202 includes a cell housing 210 having a top 212 and side walls 214. In the illustrated embodiment, the cell housing 210 is boxed shaped having four side walls 214. The battery cell 202 has a gas pressure valve 216 on the top 212.

The battery cell 202 includes a positive cell terminal 220 and a negative cell terminal 222. The positive cell terminal 220 defines a threaded stud that is configured for a threaded connection. The negative cell terminal 222 defines a smooth pin that is configured for a quick connect connection.

Figure 9:
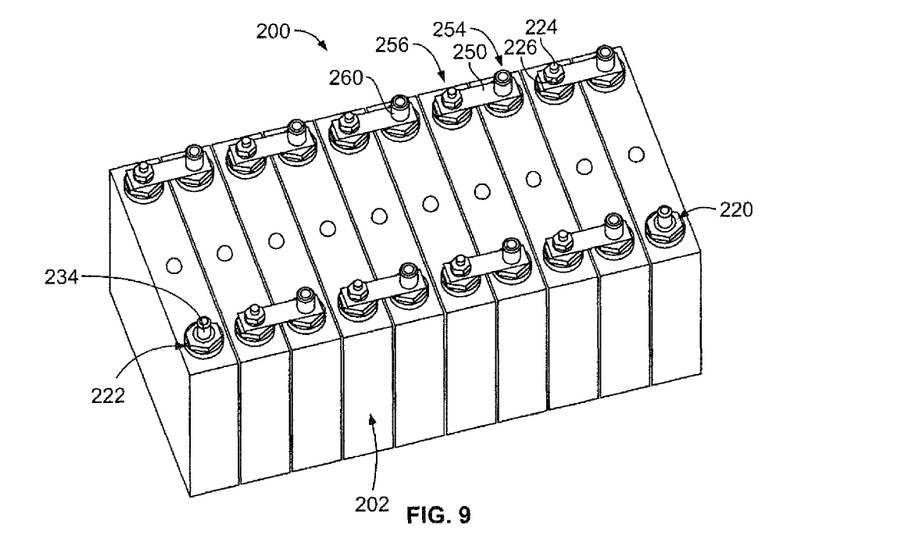
FIG. 9 is a top perspective view of a plurality of the battery cells shown in FIG. 7 arranged together in a stacked configuration to define a battery module.

The positive cell terminal 220 includes a threaded stud 224 that is configured to threadably receive a threaded nut 226 (shown in FIG. 9). The positive cell terminal 220 has an upper shoulder 228 exposed at a top of the positive cell terminal 220. The threaded stud 224 extends upward beyond the upper shoulder 228. A hex nut 230 is coupled to the positive cell terminal 220 to hold the positive cell terminal 220 with respect to the top 212 of the cell housing 210. A spacer 232 is positioned between the hex nut 230 and the top 212 of the cell housing 210. Other connection means or components may be used in alternative embodiments to secure the positive cell terminal 220 to the cell housing 210.

The negative cell terminal 222 includes a smooth pin 234. The pin 234 extends upward from an upper shoulder 238 exposed at a top of the negative cell terminal 222. In an exemplary embodiment, the pin 234 is formed integral with the negative cell terminal 222, such as with the component defining the upper shoulder 238. Alternatively, the pin 234 may be a separate component coupled to the negative cell terminal 222. A hex nut 240 is coupled to the negative cell terminal 222 to hold the negative cell terminal 222 with respect to the top 212 of the cell housing 210. A spacer is positioned between the hex nut 240 and the top 212 of the cell housing 210. Other connection means or components may be used in alternative embodiments to secure the negative cell terminal 222 to the cell housing 210.

Figure 8:
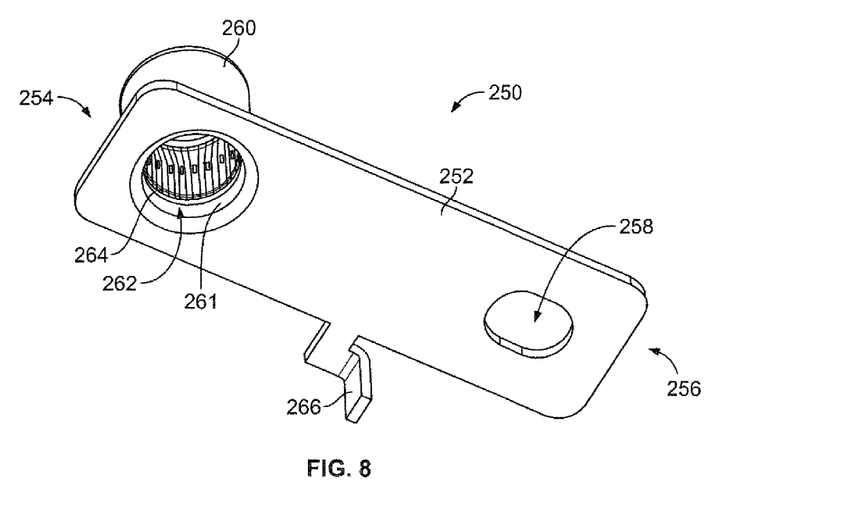
FIG. 8 is a bottom perspective view of a buss bar formed in accordance with an exemplary embodiment.

FIG. 8 is a bottom perspective view of a buss bar 250 formed in accordance with an exemplary embodiment. The buss bar 250 is used to electrically connect battery terminals of adjacent prismatic battery cells 202 (shown in FIG. 7). The buss bar 250 includes a plate 252 extending between a quick connection end 254 and a threaded connection end 256. The plate 252 includes an opening 258 at the threaded connection end 256. The opening 258 is configured to receive a threaded fastener, such as the threaded stud 224 (shown in FIG. 7), therethrough. Optionally, the opening 258 maybe elongated along a longitudinal axis of the plate 252. In the illustrated embodiment, the plate 252 is generally rectangular in shape and is elongated along the longitudinal axis of the plate 252. The plate 252 may have other shapes and alternative embodiments.

The plate 252 includes a post 260 extending therefrom at the quick connection end 254. Optionally, the post 260 may be cylindrical in shape. In the illustrated embodiment, the post 260 extends upward from a top of the plate 252. The post 260 extends out of a plane defined by the plate 252. In an exemplary embodiment, the post 260 is extruded from the plate 252. The post 260 may be formed by other processes and alternative embodiments. Optionally, the post 260 may be integrally formed with the plate 252. Alternatively, the post 260 may be a separate component from the plate 252 and coupled thereto, such as by soldering, welding, fastening or otherwise securing the post 260 to the plate 252. Optionally, the post 260 may be hollow and include an inner surface 261 that defines a chamber 262 therein. A contact spring 264 is received in the chamber 262. The contact spring 264 may be similar to the contact spring 136 (shown in FIG. 2).

In an exemplary embodiment, the buss bar 250 includes a voltage sensing pin 266 extending therefrom. The location of the voltage sensing pin 266 may vary depending on the particular application. In the illustrated embodiment, the voltage sensing pin 266 is approximately centered between the opening 258 and the post 260. The voltage sensing pin 266 is bent out of the plane defined by the plate 252. In an exemplary embodiment, the voltage sensing pin 266 is integrally formed with the plate 252. In alternative embodiments, the voltage sensing pin 266 may be a separate component coupled to the plate 252, such as by being soldered, welded, fastened or otherwise secured to the plate 252. Optionally, the voltage sensing pin 266 may be stamped and formed with the plate 252.

FIG. 9 is a top perspective view of a plurality of the battery cells arranged together in a stacked configuration to define a battery module 200. The battery module 200 may include a cover, similar to the battery cover 104 (shown in FIG. 1). The battery cells 202 are arranged side-by-side adjacent one another such that the cell terminals 220, 222 have an alternating positive-negative-positive-negative configuration.

The buss bars 250 are used to connect adjacent battery cells 202. Each buss bar 250 is connected to a positive cell terminal 220 of one battery cell 202 and a negative cell terminal 222 of an adjacent battery cell 202. The quick connection end 254 of each buss bar 250 is coupled to one of the negative cell terminals 222 while the threaded connection end 256 of each buss bar 250 is coupled to the corresponding positive cell terminal 220 using a corresponding threaded nut 226. The quick connect connection between the buss bar 250 and the negative cell terminal 222 is made by plugging the post 260 (shown in FIG. 8) of the buss bar 250 onto the negative cell terminal 222. The quick connect connection is made by an action in a linear direction, while the threaded connection is made by an action of rotating the threaded nut 226 onto the threaded stud 224 in a rotation direction. No other action is required to make the electrical connection between the buss bar 250 and the negative cell terminal 222 other than plugging the pin 234 of the negative cell terminal 222 into the post 260. Having the buss bar 250 connected to the two battery cells 202 by only making one threaded connection reduces the assembly time of the battery module 200. Eliminating threaded connections to some of the cell terminals (e.g. the negative cell terminals 222) eliminates potential failure modes due to over tightening, under tightening cross-threading and the like. In alternative embodiments, the quick connect end may be coupled to the positive cell terminal 220 while the threaded connection end is coupled to the negative cell terminal 222.

Figure 10:
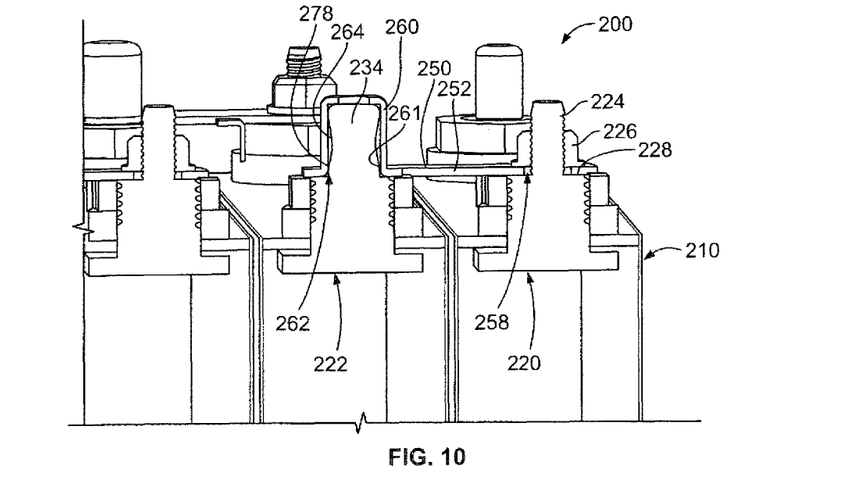
FIG. 10 is a partial cross sectional view of a portion of the battery module shown in FIG. 9.

FIG. 10 is a partial cross sectional view of a portion of the battery module 200. The threaded stud 224 of the positive cell terminal 220 is illustrated in FIG. 10 extending from the main body of the positive cell terminal 220. The threaded stud 224 may be integral with the main body, such as being cast or machined from an aluminum material. In an alternative embodiment, the threaded stud 224 may be a separate component from the main body of the positive cell terminal 220. For example, the main body may be cast or machined to have a threaded bore that receives the threaded stud 224. The main body may be aluminum and the threaded stud may be aluminum or steel. Other materials may be used for the components in other embodiments.

The opening 258 of the buss bar is aligned with the threaded stud 224 such that the threaded stud 224 is passed through the opening 258. The threaded nut 226 is tightened onto the threaded stud 224 such that the plate 252 is captured between the threaded nut 226 and the upper shoulder 228. An electrical connection is made between the buss bar 250 and the positive cell terminal 220 by the intimate contact between the buss bar 250 and the upper shoulder 228 and/or by an electrical path defined between the positive cell terminal 220 and the threaded nut 226.

The negative cell terminal 222 includes the smooth pin 234 extending upward from the main body of the negative cell terminal 222. The pin 234 may be integral with the main body, such as being cast or machined from a copper material. In an alternative embodiment, the pin 234 may be a separate component from the main body of the negative cell terminal 222. For example, the main body may be cast or machined to have a threaded bore that receives a threaded end of the pin 234. Other materials may be used for the components in other embodiments.

The contact spring 264 is received in the chamber 262 of the post 260. The contact spring 264 engages the wall of the post 260 defining the chamber 262. The contact spring 264 is electrically connected to the buss bar 250 by the direct engagement between the contact spring 264 and the post 260. The post 260 is sized and shaped to receive the pin 234. When the pin 234 is loaded into the chamber 262, an outer surface 278 of the pin 234 engages the contact spring 264. The contact spring 264 is spring biased against the outer surface 278 of the pin 234 to ensure engagement between the pin 234 and the contact spring 264. An electrical path is created between the pin 234 of the negative cell terminal 222 and the buss bar 250 by the contact spring 264. No other mechanical manipulation of the buss bar 250 or the post 260 is needed to create the electrical connection between the buss bar 250 and the negative cell terminal 222 other than plugging the post 260 directly onto the pin 234. A quick connection is defined between the negative cell terminal 222 and the buss bar 250.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plane-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A battery module comprising:
   first and second battery cells each having positive and negative cell terminals; and
   a buss bar connecting the positive cell terminal of the first battery cell to the negative cell terminal of the second battery cell, the connection to the positive cell terminal being a threaded connection to fixedly secure the buss bar to the first and second battery cells, the connection to the negative cell terminal being a quick connect connection allowing the connection to the negative cell terminal to be made without any threaded fasteners.

2. The battery module of claim 1, wherein the quick connect connection is made by plugging the buss bar onto the negative cell terminal.

3. The battery module of claim 1, wherein the quick connect connection is made by an action in a linear direction, and wherein the threaded connection is made by an action in a rotation direction.

4. The battery module of claim 1, wherein the threaded connection is made by at least one of a threaded nut and a threaded screw.

5. The battery module of claim 1, wherein the buss bar includes a quick connection end and a threaded connection end, the quick connection end having a post with a chamber, the post having an inner surface defining the chamber, a contact spring being held in the chamber and engaging the inner surface, the contact spring engaging the negative cell terminal to electrically couple the negative cell terminal to the buss bar.

6. The battery module of claim 1, wherein the buss bar includes a quick connection end and a threaded connection end, the quick connection end having a post having an outer surface, a contact spring being held in the negative cell terminal and engaging the outer surface when the post is plugged into the negative cell terminal to electrically couple the negative cell terminal to the buss bar.

7. The battery module of claim 1, wherein the buss bar includes a plate extending between a quick connection end and a threaded connection end, the plate including an opening at the threaded connection end receiving a threaded fastener therethrough, the plate including a post extending therefrom at the quick connection end, a contact spring being spring biased between the post and the negative cell terminal to create an electrical path between the negative cell terminal and the buss bar.

8. The battery module of claim 1, wherein the buss bar includes a voltage sensing pin extending therefrom, the voltage sensing pin being electrically connected to a module controller for monitoring a voltage on the buss bar.

9. The battery module of claim 1, wherein the negative cell terminal includes a smooth bore that receives a contact spring therein, the buss bar having a post received in the bore of the negative cell terminal, the contact spring engaging the post to electrically couple the negative cell terminal to the buss bar.

10. The battery module of claim 1, wherein the negative cell terminal includes a pin extending therefrom, the buss bar having a post with a chamber, a contact spring being received inside the chamber, the buss bar being coupled to the negative cell terminal such that the pin is received in the chamber, the contact spring engaging the pin to electrically couple the negative cell terminal to the buss bar.

11. The battery module of claim 1, wherein the buss bar includes a quick connection end and a threaded connection end, the threaded connection end including an opening receiving a threaded fastener therethrough.

12. The battery module of claim 1, wherein the positive cell terminal includes a threaded bore that threadably receives a threaded screw, the buss bar having an opening aligned with the threaded bore and receiving the threaded screw there through, the buss bar being captured between a head of the threaded screw and the positive cell terminal.

13. The battery module of claim 1, wherein the positive cell terminal includes an upper shoulder and a threaded stud extending upward from the upper shoulder, the buss bar having an opening aligned with and receiving the threaded stud, a threaded nut being threadably coupled to the threaded stud, the buss bar being captured between the threaded nut and the upper shoulder.

14. The battery module of claim 12 wherein the threaded stud is integrally formed with the positive cell terminal.

15. The battery module of claim 1, wherein a second buss bar is configured to connect the negative cell terminal of the first battery cell to a positive cell terminal of a battery cell of another battery module.

16. The battery module of claim 1, further comprising a negative battery terminal contact having a quick connection end being coupled to the negative cell terminal of the first battery cell, the negative battery terminal contact having a crimp end crimped to a wire.

17. A battery module comprising:

a first battery cell having a positive cell terminal and a negative cell terminal;

a first buss bar configured to be connected to a second battery cell, the first buss bar comprising a quick connection end and a threaded connection end, the quick connection end being configured to be connected to a negative cell terminal of the second battery cell, the threaded connection end being connected to the positive cell terminal of first battery cell by a threaded connection, the threaded connection end having an opening receiving a threaded fastener therethrough, the threaded fastener securing the threaded connection end to the first battery cell; and a second buss bar configured to be connected to a third battery cell, the second buss bar comprising a quick connection end and a threaded connection end, the quick connection end being connected to the negative cell terminal of the first battery cell by a quick connect connection, the threaded connection end having an opening configured to receive a threaded fastener therethrough.

18. The battery module of claim 17, wherein each of the first and second buss bars includes a plate extending between the quick connection ends and the threaded connection ends, each plate including a voltage sensing pin extending therefrom, the voltage sensing pin being electrically connected to a module controller for monitoring a voltage on the buss bar.

19. The battery module of claim 17, wherein the negative cell terminal includes a smooth bore that receives a contact spring therein, the second buss bar having a post received in the bore of the negative cell terminal, the contact spring engaging the post to electrically couple the negative cell terminal to the second buss bar.

20. The battery module of claim 17, wherein the negative cell terminal includes a pin extending therefrom, the second buss bar having a post with a chamber, a contact spring being received inside the chamber, the second buss bar being coupled to the negative cell terminal such that the pin is received in the chamber, the contact spring engaging the pin to electrically couple the negative cell terminal to the second buss bar.

* * * * *